United States Patent
Noda

[11] Patent Number: 6,046,829
[45] Date of Patent: Apr. 4, 2000

[54] SOLID-STATE IMAGING ELEMENT AND IMAGE READING DEVICE

[75] Inventor: Satoshi Noda, Ebina, Japan

[73] Assignee: Fuji Xerox Co., Ltd., Tokyo, Japan

[21] Appl. No.: 08/984,177

[22] Filed: Dec. 3, 1997

[30] Foreign Application Priority Data

Dec. 13, 1996 [JP] Japan ................................. 8-334330

[51] Int. Cl.⁷ .................................................. H04N 1/46
[52] U.S. Cl. ........................... 358/513; 358/512; 358/514
[58] Field of Search ..................... 358/512, 513, 358/514, 515, 482, 483; 348/272–277, 268

[56] References Cited

U.S. PATENT DOCUMENTS

| | | | |
|---|---|---|---|
| 5,675,425 | 10/1997 | Imoto et al. | 358/513 |
| 5,757,520 | 5/1998 | Takashima | 358/513 |
| 5,841,554 | 11/1998 | Hasegawa | 358/514 |
| 5,870,142 | 2/1999 | Noda et al. | 348/266 |

FOREIGN PATENT DOCUMENTS

| | | |
|---|---|---|
| 3-178262 | 8/1991 | Japan . |
| 7-46371 | 2/1995 | Japan . |

*Primary Examiner*—Kimberly A. Williams
*Attorney, Agent, or Firm*—Oliff & Berridge, PLC

[57] ABSTRACT

A solid-state imaging element includes a color filter which selectively transmits an optical image in color components, and in which a plurality of colors are arranged as one group in a sequential plural group configuration, a photoelectric converter for receiving an optical image that has passed through the color filter and for converting the received optical image to electric signals, and combining circuitry for combining at least two of the electric signals correlating to the colors of one group of the color filter converted by the photoelectric converter. In a dot-sequential type color linear sensor, shift gates that are independent for each color respectively are provided in pixel units on both sides of a dot-sequentially arranged light sensitive image element array on which image elements of first, second and third colors are arranged. Two transmission registers are arranged on one side of the light sensitive image element array for use with a first color, and the number of register columns of the first color transmission registers are set to be one-half that of second and third color registers. In addition, during the black/white mode, the signal charges of the three colors are added using transmission registers on the one side of the array and the signal charges are output in parallel. Also, an image reading device which includes a solid-state imaging element, wherein the imaging element is arranged in the main scanning direction, and further including an optical scanning system for optically scanning the original document in the direction of secondary scanning, and for irradiating the optical image to the imaging surface of said solid-state imaging element.

12 Claims, 13 Drawing Sheets

SOLID-STATE IMAGING ELEMENT AND IMAGE READING DEVICE

BACKGROUND OF THE INVENTION

1. Field of Invention

The invention relates to a solid-state imaging element and a picture image reading device equipped with such an element, and relates especially to a photocopier, scanner or the like, which read color picture images using such elements.

2. Description of Related Art

In prior picture image reading devices, for solid-state picture imaging elements that read color original documents, a structure is widely used in which color filters are either formed on-chip or adhered onto a light sensitive image element array composed of CCD-type or MOS-type sensors (photoelectric converting elements) arranged in large numbers in a straight line formation. In particular, presently, this three-line-type CCD linear sensor is common in which light sensitive image element arrays for each of the three colors R (red), G (green), and B (blue) are arranged in a linear order, and in which two electric charge transmitters are arranged on both sides of each light sensitive image element array, maintaining a high speed by parallel driving. The structural schematic of the three-line-type CCD linear sensor is shown in FIG. 12.

In FIG. 12, the three light sensitive image element arrays 101, 102 and 103 for R, G, and B are arranged in parallel, and electric transmitters (named below as the transmission register) 104o, 104e, 105o, 105e, 106o and 106e are arranged on both sides of each light sensitive image element array 101, 102 and 103. Moreover, shift gates 107o and 107e are provided between the R light sensitive image element array 101 and the transmission registers 104o and 104e, shift gates 108o and 108e are provided between the G light sensitive image element array 102 and the transmission registers 105o and 105e, and shift gates 109o and 109e are provided between the B light sensitive image element array 103 and the transmission registers 106o and 106e.

A shift pulse SH is impressed from the shift pulse generating circuit to each gate electrode of the shift gates 107o and 107e and, accordingly, the shift gate 107o shifts the signal charges of the odd numbered pixels (hereafter, simply referred to as odd pixels) in the R light sensitive image element array 101 to the transmission register 104o, and the shift gate 107e shifts the signal charges of the even numbered pixels (hereafter, simply referred to as even pixels) to the transmission register 104e. Similarly, the shift gates 108o and 108e shift each signal charge of the odd and even pixels in the G light sensitive image element array 102 to the transmission registers 105o and 105e, respectively, and the shift gates 109o and 109e shift each signal charge of the odd and even pixels in the B light sensitive image element array 103 to the transmission registers 106o and 106e.

The transmission registers 104o, 104e, 105o, 105e, 106o and 106e are composed of the same number of register columns as the number of image elements in the light sensitive image element arrays 101, 102 and 103. By using a transmission electrode of a two-layer structure, for example, in every column, and impressing two-phase horizontal transmission pulses Ø1 and Ø2 from the horizontal transmission pulse generating circuit 111 to this transmission electrode, the signal charge of odd numbered image elements and the signal charge of even numbered image elements are horizontally transmitted in parallel. Charge/voltage converters 112o, 112e, 113o, 113e, 114o and 114e of a floating diffusion amp structure, for example, are provided at each of the transmission receiving terminals of the transmission registers 104o, 104e, 105o, 105e, 106o and 106e.

The charge/voltage converters 112o, 112e, 113o, 113e, 114o and 114e convert the signal charges sequentially transmitted by transmission registers 104o, 104e, 105o, 105e, 106o and 106e to signal voltages. Each output voltage of the charge/voltage converters 112o and 112e is supplied to the multiplexor 118 via the output amps 115o and 115e, respectively. Similarly, each output voltage of the charge/voltage converters 113o and 113e is supplied to the multiplexor 119 via the output amps 116o and 116e, respectively, and each output voltage of the charge/voltage converters 114o and 114e is supplied to the multiplexor 120 via the output amps 117o and 117e, respectively.

The multiplexors 118, 119 and 120 perform serial conversion on the even and odd numbered image element signal lines supplied in parallel via output amps 115o, 115e, 116o, 116e, 117o and 117e, then output the even and odd numbered image element signal lines as analog image signals of the three colors R, G and B, which are alternately connected in rows. The R, G and B analog image signals are converted to digital image signals by A/D converters 121, 122 and 123, and are then supplied to the image processor 124. In the image processor 124, the various signal processing such as color correction processing and the like of the three colors R, G and B is performed.

However, in the case of the three-line-type CCD linear sensor described above, due to the juxtaposition of R, G and B light sensitive image element arrays 101, 102 and 103 at a specified interval in the direction of secondary scanning, the following problems exist, specifically:

1. because an electrical circuit that corrects by using a delay circuit that uses memory is essential due to a shift of color registration resulting from gaps between the light sensitive image element arrays 101, 102 and 103 of the secondary scanning direction, extra cost is required for the memory portion;

2. in a copier or a flatbed-type scanner, because of the added external primary factor of circumstantial oscillation in performing mechanical scanning in the secondary scanning direction, image quality defects such as color shifts and the like occur easily; and 3. in a reduced copy, for every variation of 1% through changing of the scanning speed, there are many points at which the gap correction amount of the light sensitive image element arrays 101, 102 and 103 does not appear as an integer.

The focus here is a dot-sequential-type CCD linear sensor of linear construction in which R, G and B pixels are repeatedly arranged in the main scanning direction. A schematic of the structure of the dot-sequential-type CCD linear sensor is shown in FIG. 13. In FIG. 13, for example, one light sensitive image element array 202 is formed by a dot-sequentially repeated arrangement of each pixel 201B, 201G and 201R in the order of B, G, R from the left side of the figure. In this light sensitive image element array 202, the three image elements 201B, 201G and 201R of the dot-sequentially arranged B, G and R form one pixel. One transmission register 203 is arranged below the light sensitive image element array 202 in the diagram, and two transmission registers 204 and 205 are arranged above.

FIG. 14 is an enlarged diagram of one pixel unit in the light sensitive image element array 202. As is especially clear from FIG. 13, a shift gate 206 is provided between the light sensitive image element array 202 and the transmission register 203 to read out the signal charge of the B image element 201B to the transmission register 203. Shift gates 207 and 208 are provided between the light sensitive image element array 202 and the transmission register 204 in order to read out the respective signal charges of the pixels 201G and 201R to the transmission register 204. In addition, shift gate 209 is provided between the transmission register 204 and the transmission register 205 in order to shift the R signal charges from the G and R signal charges read out by the transmission register 204 to the transmission register 205.

A shift pulse SH is impressed from the shift pulse generating circuit 210 to shift gates 206–209. The transmission registers 203, 204 and 205 are structured with two register columns for a single pixel and, for example, by using a transmission electrode of a two-layer structure at every other level and impressing two-phase horizontal transmission pulses Ø1 and Ø2 from the horizontal transmission pulse generating circuit 211 to these transmission electrodes, B, G and R signal charges are horizontally transmitted in parallel. At the transmission receiving terminal of each of the transmission registers 203, 204 and 205, electric charge/voltage converters 212, 213 and 214 of, for example, a floating diffusion amp structure are provided.

The electric charge/voltage converters 212, 213 and 214 convert the B, G and R signal charges sequentially transmitted by the transmission registers 203, 204 and 205 into signal voltages. The analog image signals of B, G and R output from the electric charge/voltage converters 212, 213 and 214 are converted into digital image signals by A/D converters 218, 219 and 220 after passing through the output amps 215, 216 and 217, and supplied to image processor 221. In the image processor 221, various signal processing such as color correction processing and the like is performed for the three colors R, G and B.

Because the above described dot-sequential-type CCD linear sensor has one light sensitive image element array, problems as in the case of the previously described three-line-type CCD linear sensor do not occur. However, on the other hand, the problem of difficulty in high-speed reading occurs as a characteristic of the dot-sequential-type CCD linear sensor, but does not occur in the three-line-type CCD linear sensor. This results from the following reasons, specifically:

1. because the image element size for one color is simply approximately ⅓ that of the three-line-type, and the signal output of the image element is decreased, the reading cycle has to be lengthened in order to maintain the dynamic range; and 2. in the layout, because of the difficulty in arranging a transmission register of two lines for each color, for a total of six lines, on both sides of the light sensitive image element array, as in the three-line-type, the video rate cannot be raised by two parallel outputs per one color.

In contrast to the above, a CCD linear sensor that uses a so-called three-line/dot-sequential switching method combining the use of the three-line-type CCD linear sensor and the dot-sequential-type CCD linear sensor, is proposed (refer to Japanese Patent Publication No. Hei 7-46371). However, since this method, in all actuality, is essentially a two-line-type CCD linear sensor in which only the G and R combination comprises dot-sequential light sensitive image element arrays, and in which B comprises a dot-sequential light sensitive image element array that is arranged with a gap with respect to these other light sensitive image element arrays, it cannot avoid having the above-mentioned three problem points of a three-line-type CCD linear sensor that originate in the gap of the light sensitive image element arrays. Furthermore, because the transmission register has a structure of only one color, and one line, it cannot avoid the second problem point of the dot-sequential-type CCD linear sensor.

In recent years, while advancements are being made in colorization of OA machinery such as copiers, scanners, printers, and the like, and black/white usage is also increasing because of its moderate cost, there is a demand for combined color and black/white machines. That is, high speed reading as in the conventional analog copier for a black/white original document, and slow reading due to importance of image quality for a color original document. In such a case, the reading sensor, must obviously be a color sensor, and constraints in performing high image quality full color reading become a problem in performing high speed reading. Specifically, when reading a black/white image using a color-use CCD linear sensor, since it can only be read at the same speed as the reading speed of a color image, the high speed reading that accompanies a black/white machine cannot be realized.

SUMMARY OF THE INVENTION

The solid-state imaging element of this invention comprises color filters which selectively transmit an optical image in color components and which are arranged sequentially in a plurality of groups, with a plurality of colors as one group; photoelectric converting means for receiving the optical image transmitted through these color filters and converting it to electric signals; and combining means for combining at least two of the electric signals corresponding to the color of one group of the color filter converted by the photoelectric converting means.

In addition, the invention comprises a first transmission register (first output component) arranged on one side of the photoelectric converting means for dividing a signal charge corresponding to a first color among the colors of one group of the color filter into n ($n \geq 2$) systems and transmitting them in parallel, and second and third transmission registers (second and third output components) arranged on the other side of the photoelectric converting means for transmitting in parallel the signal charges corresponding respectively to second and third colors among the colors of one group of the color filter. Electric signals are combined in the first transmission register, and the register column number is set to be 1/n of that of the second and third transmission registers.

In the solid-state imaging element of the above described structure, at least two of the electric signals among the electric signals corresponding to the colors of one group of the color filter converted by the photoelectric converting means are combined by the combining means. Therefore, the signal output level becomes greater than in the case where only the electric signal corresponding to one color from the colors of one group of the color filter are read. In addition, since the first transmission register outputs in parallel the signal charges that are dividing n systems, and since the register column number is 1/n of that of the second and third transmission registers, the transmission speed of the signal charge in the first transmission register becomes n times that of the second and third transmission registers.

In this invention, an objective is to provide a solid-state imaging element that improves the dynamic range and video rate, and which is capable of both high speed black/white reading time and high image quality in color reading time, without detracting from the advantage of the dot-sequential method in terms of superior image quality and cost, and to also provide an image reading device equipped with such a device.

BRIEF DESCRIPTION OF THE DRAWINGS

The invention is described with reference to the following drawings wherein like numerals represent like elements, and wherein.

DETAILED DESCRIPTION OF PREFERRED EMBODIMENTS

Embodiments of the invention are described in detail below with reference to the drawings.

Figure 1:
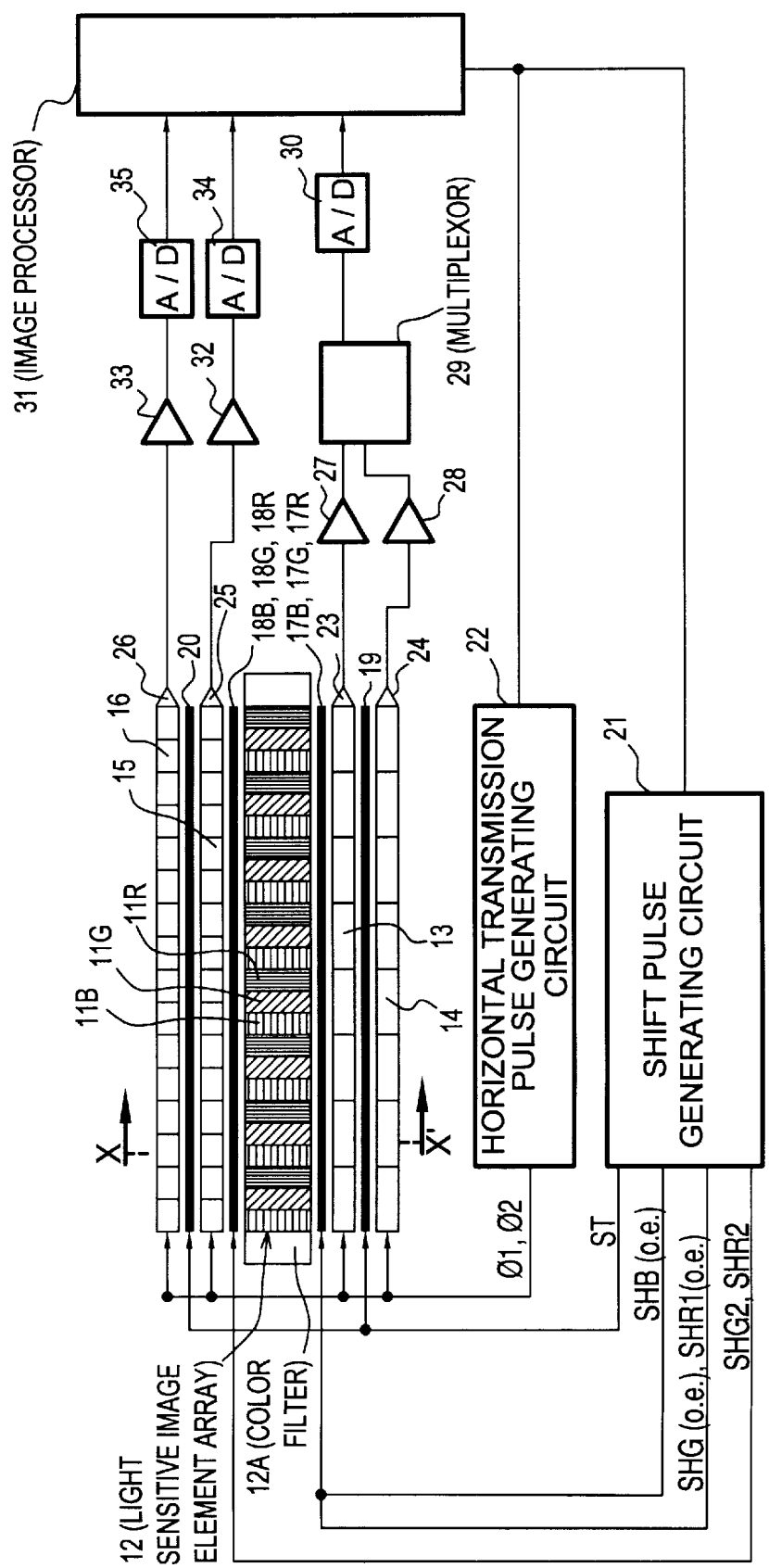
FIG. 1 is a schematic structural diagram showing an embodiment of the invention.

FIG. 1 is a schematic structural diagram of one embodiment of the invention. In FIG. 1, a single line light sensitive image element array 12 is formed by a dot-sequentially repeated arrangement of image elements 11B, 11G and 11R, which comprise photoelectric conversion elements such as photodiodes or the like. An optical image is selectively passed in color components onto each image element 11B, 11G and 11R of the light sensitive image element array 12, and a color filter 12A is arranged which combines multiple colors (the three colors B, G and R in this example) into one group.

In the light sensitive image element array 12, the dot-sequentially arranged image elements 11B, 11G and 11R of the three color components B, G and R compose one pixel and, as an example, for a simplified explanation, the figure shows the structure of eight pixel units. On both sides of the light sensitive image element array 12 in the secondary scanning direction (from top to bottom in the diagram), two lines each of transmission registers comprising CCDs are arranged. Specifically, two-system transmission registers 13 and 14 are arranged below the light sensitive image element array 12 in the diagram for B, and two transmission registers 15 and 16 are arranged above the array for G and R.

Figure 2:
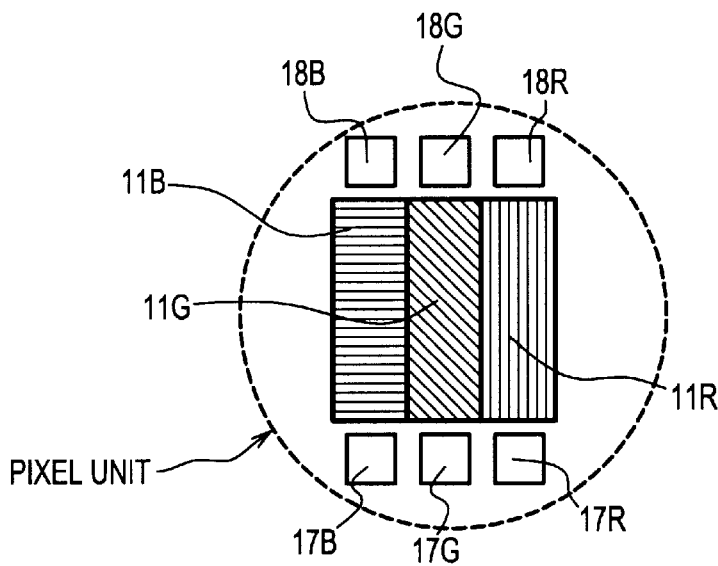
FIG. 2 is an enlarged figure of one pixel unit in an embodiment of FIG. 1.

FIG. 2 shows an enlarged diagram of one pixel unit in the light sensitive image element array 12. As is especially clear from FIG. 2, a three-system shift gate 17B, 17G, 17R is provided between the light sensitive image element array 12 and the transmission register 13 in one pixel in the independent image element units, and these shift gates 17B, 17G and 17R are arranged so as to correspond to each color in the pixel. In addition, regarding the readout of signal charges to the side of the transmission registers 13 and 14, as described later, the odd numbered pixels (hereafter, referred to simply as odd pixels) and the even numbered pixels (hereafter, referred to simply as even pixels) are read-out alternately, and thus correspond respectively to an odd system and an even system. Namely, the resulting structure is a two-system structure of an odd system shift gate 17Bo, 17Go, 17Ro and an even system shift gate 17Be, 17Ge, 17Re for each color.

There is also a three-system shift gate 18B, 18G, 18R provided between the light sensitive image element array 12 and the transmission register 15 in one pixel in the independent image element unit corresponding to each color in the pixel. However, for shift gate 18B, as described later, the signal charge of the B image element 11B is read-out only to the transmission registers 13 and 14, so it may be omitted. In addition, shift gate 19 is provided between transmission registers 13 and 14, and shift gate 20 is provided between transmission registers 15 and 16.

Appropriate shift pulses are impressed to each gate electrode of shift gate 17B, 17G, 17R and shift gate 18G, 18R from the shift pulse generating circuit 21 for each system (each color). Specifically, since the shift gate 17B is divided into the odd system shift gate 17Bo and the even system shift gate 17Be, the two-system shift pulse SHBo, SHBe is impressed. However, for shift gate 18B, there is no readout of the signal charge of the B image element 11B to the G and B transmission registers 15 and 16, so shift pulse SHBO, SHBe is not impressed.

In addition, for each signal charge of image elements 11B and 11R, since the readout methods for the color mode and the black/white (monochroic) mode are different, a two-system shift pulse SHG1, SHR1 and a two-system shift pulse SHG2, SHR2 are respectively impressed to each gate electrode of shift gate 17G, 17R and shift gate 18G, 18R. Furthermore, since the shift gate 17G, 17R is divided into the odd system shift gate 17Go, 17Bo and the even system shift gate 17Ge, 17Be, a two-system shift pulse SHG1o, SHR1o and a two-system shift pulse SHG1e, SHR1e are respectively impressed. A corresponding shift pulse ST is impressed from the shift pulse generating circuit 21 to each gate electrode of shift gates 19 and 20.

By impressing an appropriate shift pulse to each shift gate, as described above, the signal charge of the B image element 11Bo of the odd pixel within the light sensitive image element array 12 is read-out to the transmission register 13 via shift gate 17B, and the signal charge of the B image element 11Be of the even pixel is read-out to the transmission register 14, via shift gate 17B, transmission register 13 and shift gate 19. The signal charge of the G image element 11G of all pixels within the light sensitive image element array 12 is read-out to transmission register 15 via shift gate 18G. In addition, the signal charge of the R image element 11R of all pixels within the light sensitive image element array 12 is read-out to transmission register 16 via shift gate 18R, transmission register 15 and shift gate 20.

The two-system transmission registers 13 and 14 for B are structured with the number of register columns being the same as the number of pixels in the light sensitive image element array 12. Namely, the number of register columns is ⅓ the number of image elements. The registers have in each column a transmission electrode of a two-layer structure, for example, and, two-phase horizontal transmission pulses φ1, φ2 are impressed to these transmission electrodes from the horizontal transmission pulse generating circuit 22. Therefore, the B signal charge of odd pixels and the B signal charge of the even pixels are horizontally transmitted in parallel.

The transmission registers 15 and 16 for G and R are structured with two columns for one pixel, or in other words, with a number of register columns which is ⅔ the number of image elements. As with transmission registers 13 and 14, in each column there is a transmission electrode of a two-layer structure, for example. A two-phase horizontal transmission pulse φ1, φ2 is impressed from the horizontal transmission pulse generating circuit 22 to these transmission electrodes. Therefore, the registers horizontally transmit in parallel the G signal charge and the R signal charge of all pixels. Therefore, the number of register columns in the transmission registers 15 and 16 is twice that of transmission registers 13 and 14.

Electric charge/voltage converters 23, 24, 25 and 26 of a floating diffusion amp structure, for example, are respectively provided at the transmission receiving side of transmission registers 13, 14, 15 and 16. Electric charge/voltage converters 23 and 24 convert the B signal charge of odd pixels and the B signal charge of even pixels sequentially transmitted by transmission registers 13 and 14 to respective signal voltages. Electric charge/voltage converters 25 and 26 convert the G signal charge and the R signal charge transmitted by transmission registers 15 and 16 to respective signal voltages.

Each output voltage of electric charge/voltage converters 23 and 24 is supplied to multiplexor 29 via output amps 27 and 28. Multiplexor 29 serially converts the B image element signal array of odd pixels and the B image element signal array of even pixels, which are supplied in parallel via output amps 27 and 28, and outputs a B analog image signal in which the image element signal of odd pixels and the image element signal of even pixels are alternately connected.

The B analog image signal is converted to a digital image signal by A/D converter 30 and supplied to image processor 31. Meanwhile, the G and R analog image signals output from electric charge/voltage converters 25 and 26 are converted to digital image signals by A/D converters 34 and 35 after passing through output amps 32 and 33, and supplied to image processor 31. In image processor 31, various signal processing is performed such as color correction processing and the like of the three colors R, G and B.

Figure 3:
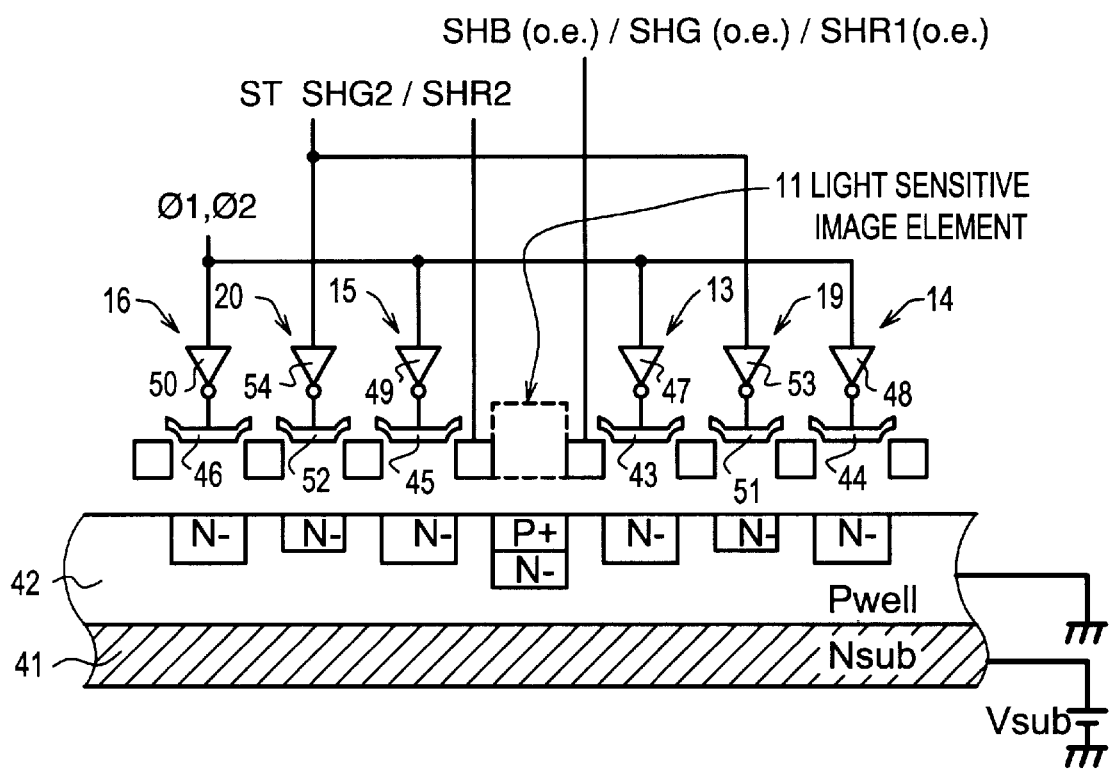
FIG. 3 is a cross-sectional structural diagram of the arrow directional cross-section of X–X' in FIG. 1.

FIG. 3 shows the cross-sectional structure of the arrow directional cross-section of X–' shown in FIG. 1. In FIG. 3, the above described light sensitive image element array 12, the transmission registers 13, 14, 15 and 16, and the shift gates 17 (17B, 17G, 17R), 18 (18B, 18G, 18R), 19 and 20 are formed in the P-well 42 on the N-substrate semiconductor board 41. In order for the light sensitive image element 11 (11B, 11G. 11R), which is an NP connector diode sensor, to measure the increase in sensitivity and the decrease in dark current, a positive hole storage accumulation structure with an added layer of P$^+$ impurities is used on the substrate surface.

Layers of N$^-$ impurities are formed on the substrate surface at portions corresponding to transmission registers 13, 14, 15 and 16. Similarly, layers of N$^-$ impurities are also formed at portions corresponding to shift gates 19 and 20.

Figure 4:
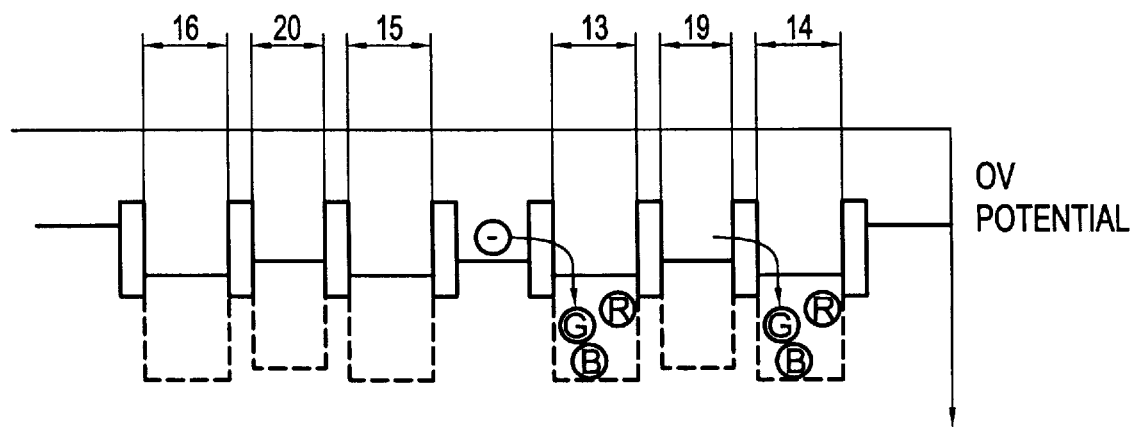
FIG. 4 is a diagram of potential in the arrow directional cross-section of X–X' of FIG. 1.

Additionally, a horizontally transmitted pulse φ1/φ2 is impressed via drives 47, 48, 49 and 50 to each transmission electrode (two-layer structure, actually) 43, 44, 45 and 46 of transmission registers 13, 14, 15 and 16. Furthermore, a shift pulse ST is impressed via drives 53 and 54 to each gate electrode 51 and 52 of shift gates 19 and 20. FIG. 4 shows the potential of each part 11, 13–15 and 19–20 in the arrow directional cross-section of X–X' of FIG. 1.

According to the above, the image elements 11B, 11G and 11R of the first, second and third colors (B, G and R in the example) are dot-sequentially arranged and use a total of 6 independent shift gates 17B, 17G, 17R, 18B, 18G and 18R, one on each side in the secondary scanning direction for each of the three colors. The two transmission registers 13 and 14 are arranged for use with the first color in one of either of the sides of the light sensitive image element array 12 and output in parallel. The column numbers for the transmission registers for the second and third colors are made to be one-half that of the column number for the first color transmission registers 13 and 14. Through this construction, a dot-sequential-type color linear sensor is formed.

Figure 5:
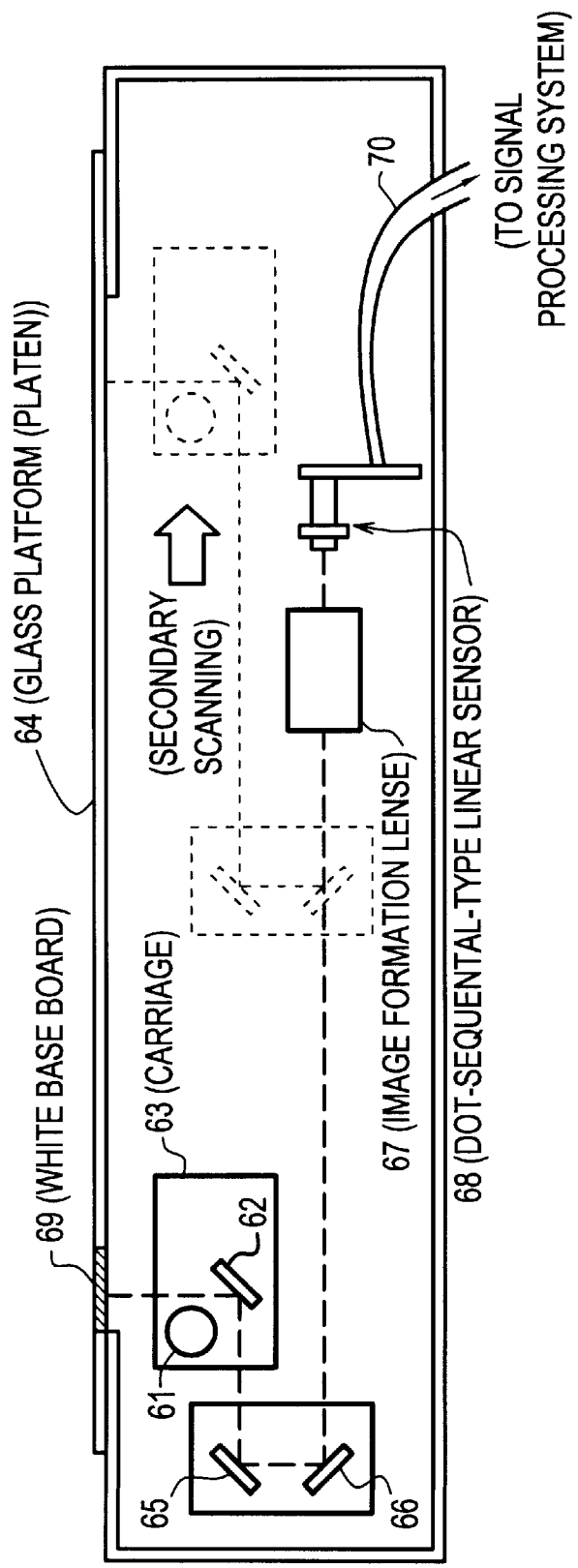
FIG. 5 is a schematic structural diagram showing an example of an image reading device in the invention.

The following describes an image reading device equipped with the dot-sequential-type color linear sensor relating to the above embodiment. FIG. 5 is a schematic structural diagram of one example of the image reading device. In FIG. 5, carriage 63, which includes light source 61 and first reflection mirror 62, scans in the direction of secondary scanning (left to right in the diagram) in FIG. 5. At this time, the light coming from light source 61 irradiates an original document (not shown) placed on the original glass platen 64, and after the reflected light passes through first reflection mirror 62 and then second and third reflection mirrors 65 and 66, it is image formed by image formation lens 67 on the imaging screen of the dot-sequential-type color linear sensor (reduction-type sensor) 68 of the embodiment. The output signal of the color linear sensor 68 is transmitted to the signal processing system by signal cable 70. In the end of original document glass platen 64, white base board 69 is provided.

Figure 6:
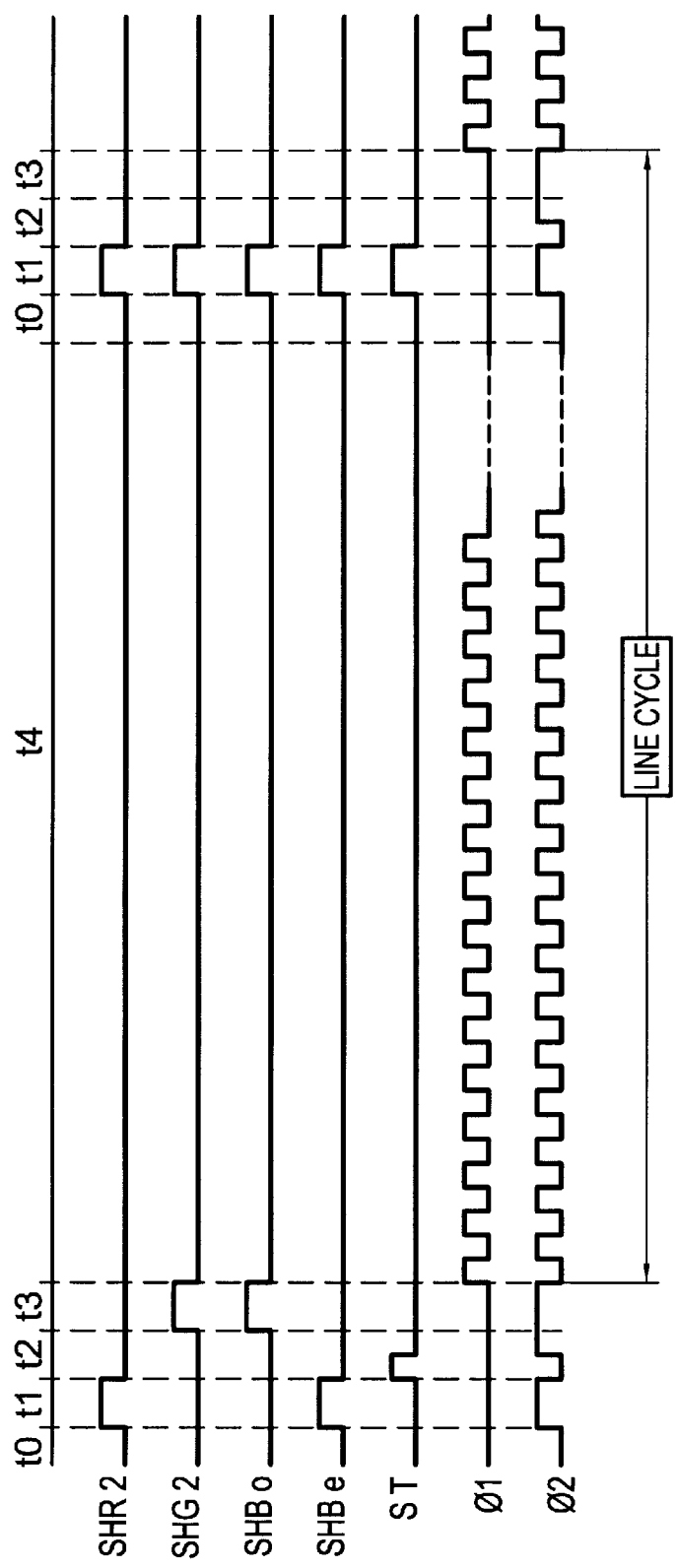
FIG. 6 is a timing chart during the color mode.
Figure 7:
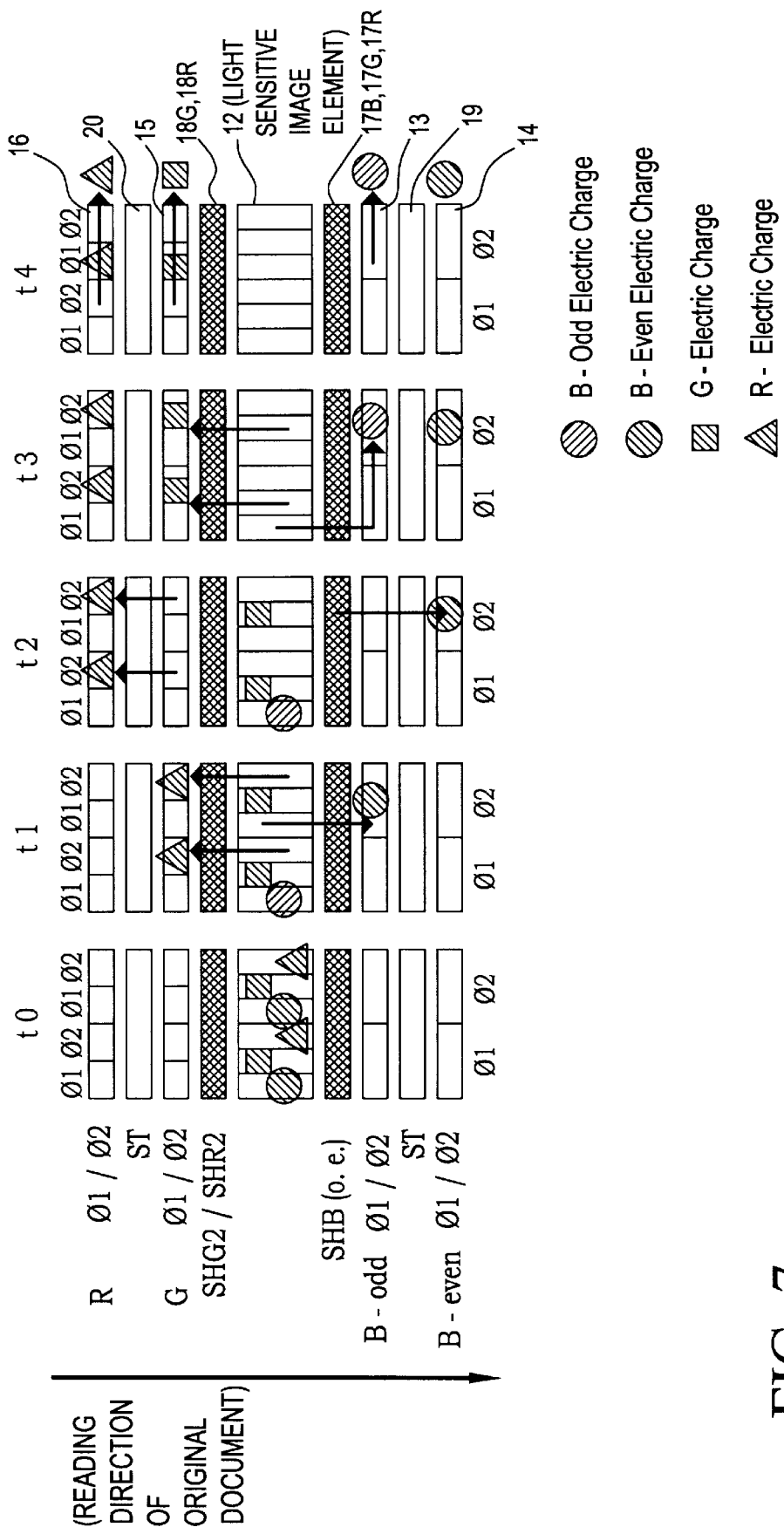
FIG. 7 explains operations during the color mode.

The operation of the image reading device of the above described structure during the color mode of dot-sequential-type color linear sensor 68 is next explained using the timing chart of FIG. 6 and referring to the operation explanation diagram of FIG. 7. In FIG. 7, a ○ represents a B signal charge, a □ represents a G signal charge, and a Δ represents an R signal charge. In addition, for the B shift gate 17B, there is a two-system shift gate 17Bo, and 17Be. However, to simplify the explanation, shift gate 17B is used in either case.

In light sensitive image element array 12, photoelectric conversion is performed at each B, G and R image element 11B, 11G and 11R by time t0, and the accumulation of signal charges is completed. From this condition, when the shift pulse SHBe and shift pulse SHR2 both become the "H" level, and the two-phase horizontally transmitted pulse φ2 simultaneously becomes the "H" level, the B signal charge of only the even pixels is read-out via shift gate 17 in the second phase register column of transmission register 13. At the same time, the R signal charge of all pixels is read-out to transmission register 15 via shift gate 18R (time period t1).

Next, the shift pulse ST transitions from the "H" level to the "L" level, and the second phase horizontal transmission pulse φ2 transitions from the "L" level to the "H" level. Thus, the B signal charge of the even pixels read-out to transmission register 13 and the R signal charge read-out to transmission register 15 are shifted to transmission register 14 and transmission register 16, respectively, via shift gate 19 and shift gate 20 (time period t2).

Next, when the second phase horizontally transmitted pulse φ2 is in the "H" level state, when shift pulse SHBo and shift pulse SHG2 both become the "H" level, the B signal charge of only odd pixels is read-out to transmission register 13 via shift gate 17B, and the G signal charge of all pixels is read-out to transmission register 15 via shift gate 18G (time period t3). At this time, in transmission register 13, horizontally transmitted pulse φ2 is at the "H" level, so the read-out signal charge is accumulated in the second phase register column via the first phase register column.

According to the above, the B signal charge of odd pixels is read-out to transmission register 13, the B signal charge of even pixels is read-out to transmission register 14, the G signal charge of all pixels is read-out to transmission register 15, and the R signal charge of all pixels is read-out to transmission register 16. In the horizontal transmission time period t4, since each transmission register 13–16 is transmission driven according to the horizontally transmitted pulses φ1 and φ2, each signal charge is sequentially horizontally transmitted.

In the horizontal transmission, the number of register columns of the B transmission registers 13 and 14 is ½ that of G and R transmission registers 15 and 16, so the transmission speed of the B signal charge of odd/even pixels is twice that of the G and R signal charge. In addition, for B, in multiplexor 29 the parallel image signals of the odd signal arrays and even signal arrays are returned to a serial image signal in which each odd/even image signal is alternately connected. This signal and the G and R image signals are supplied as three color image signals B, G and R to image processor 31 via A/D converters 30, 34 and 35.

Figure 8:
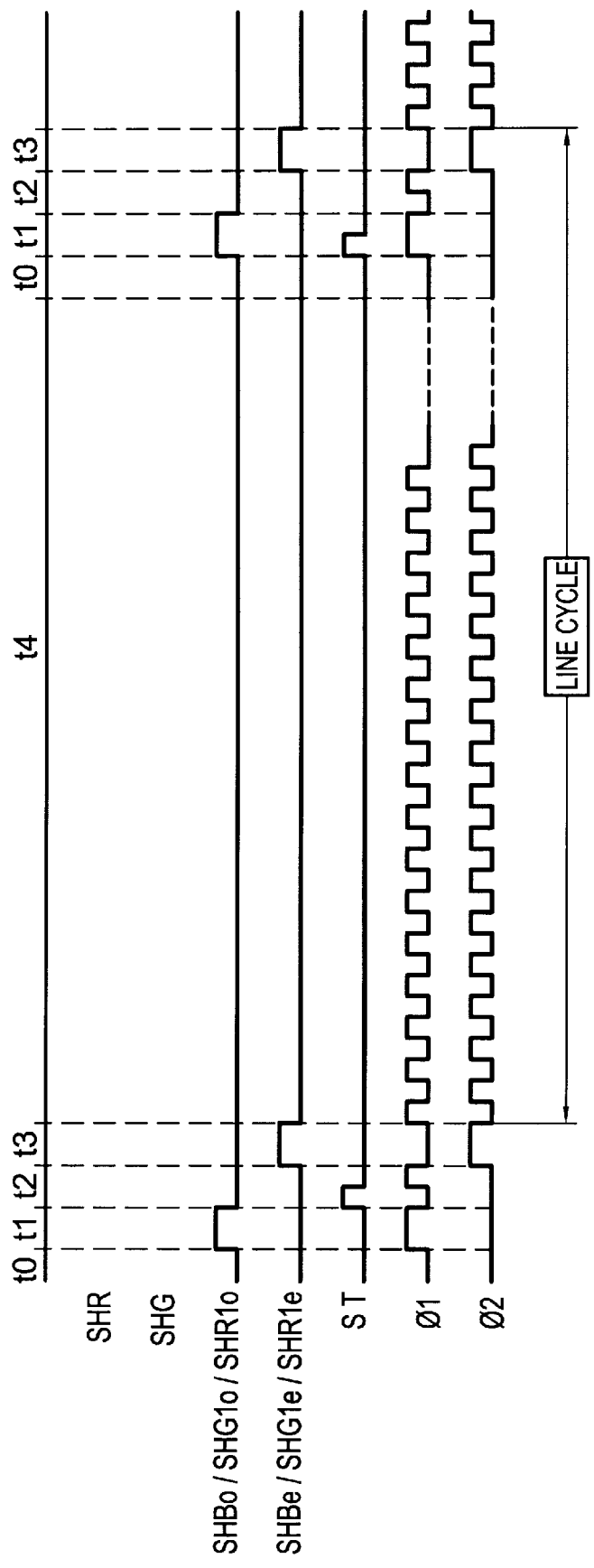
FIG. 8 is a timing chart during the black/white mode.
Figure 9:
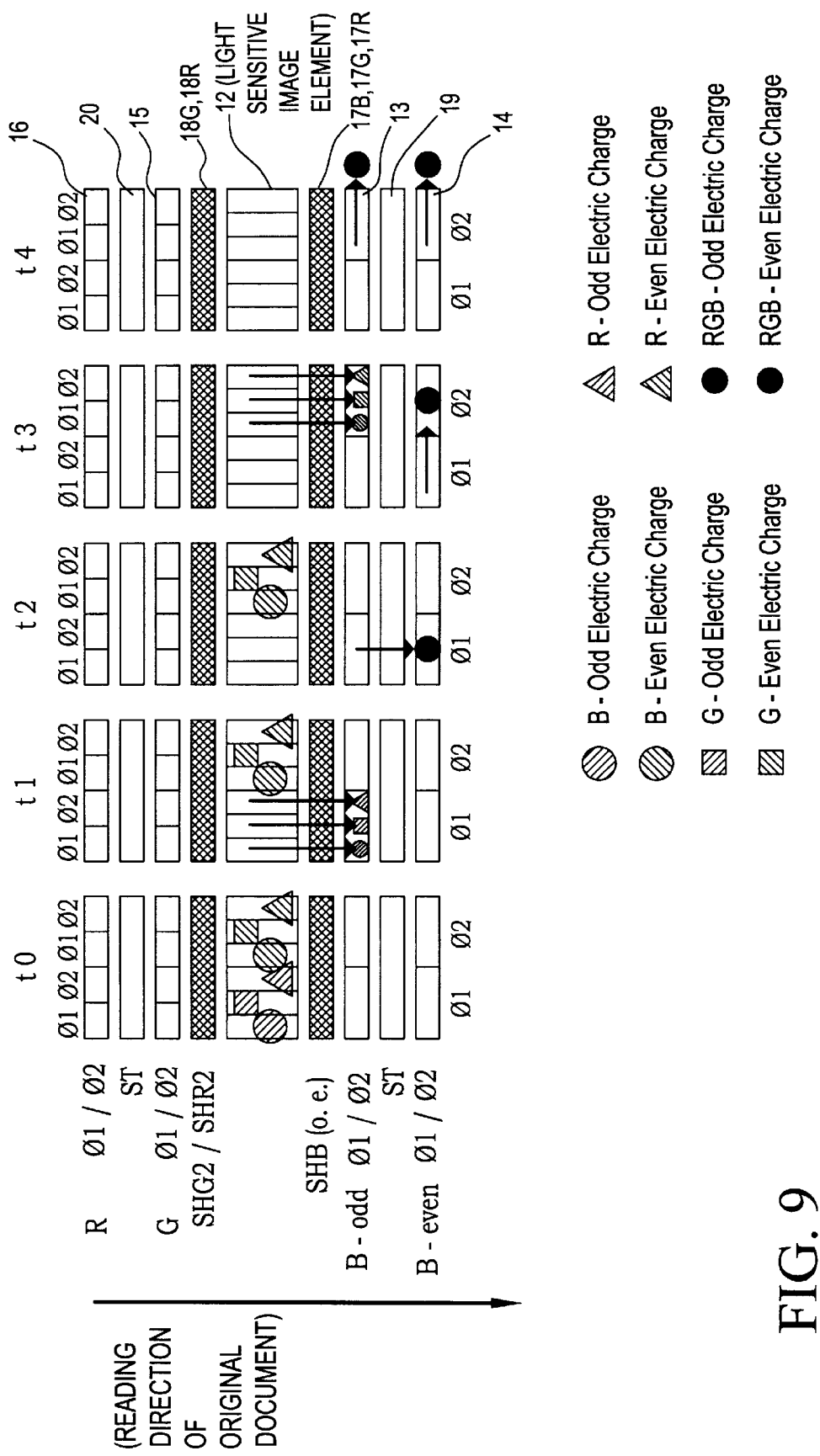
FIG. 9 explains operations during the black/white mode.

Next, the operation during the black/white mode is explained by using the timing chart of FIG. 8 and referring to the operation diagram of FIG. 9. In FIG. 9, similar to the case of FIG. 7, a ○ represents the B signal charge, a □ represents the G signal charge, and a Δ represents the R signal charge. In addition, a ● solid circle mark represents the combined signal charges of B, G and R. In the black/white mode, each B, G and R signal charge is read-out to only the B transmission registers 13 and 14, and the transmission operation is performed only by these two-system transmission registers 13 and 14.

More specifically, in light sensitive image element array 12, the photoelectric conversion is performed (time period t0) by each B, G and R image element 11B, 11G and 11R, and when the accumulation of signal charges is completed, the shift pulses SHBo, SHG1o and SHR1o of the odd system first become the "H" level and at the same time, the first phase horizontally transmitted pulse φ1 becomes the "H" level. Each B, G and R signal charge of odd pixels is read-out to the first phase register column of transmission register 13 via shift gates 17B, 17G, 17R, and the signal charges of the three colors B, G and R is combined for every pixel (time period t1).

Next, shift pulse ST transitions from the "H" level to the "L" level, and the first phase horizontal transmission pulse φ1 transitions from the "L" level to the "H" level during the same time period. The signal charges combined in the first phase register column of transmission register 13 are thereby shifted by pixel units to the first phase register column of transmission register 14 via shift gate 19 (time period t2).

Next, the shift pulses SHBe, SHG1e and SHR1e of each color of the even systems all become the "H" level, and at the same time the first phase horizontally transmitted pulse φ1 becomes the "L" level and the second phase horizontally transmitted pulse φ2 becomes the "H" level. Each B, G and R signal charge of even pixels is read-out to the second phase register column of transmission register 13 via shift gates 17B, 17G and 17R, and here, the signal charges of the three color components B, G and R are combined in every pixel, and at the same time the signal charge of the first phase register column is transmitted to the second phase register column (time period t3).

Based on the above, the signal charges of each color of even pixels B, G and R are combined, then read-out to transmission register 13 as even image element signal charges, and the signal charges of each color of odd pixels B, G and R are combined, then read-out to transmission register 14. Incidentally, the term "signal charge of each color" is used. However, this does not mean that the signal charge has color, so ultimately, it means that signal charges of three color components are added by pixel units.

Next, during the horizontal transmission period t4, each transmission register 13 and 14 is transmission driven by horizontally transmitted pulses φ1 and φ2. The signal charges of odd image elements and the signal charges of even image elements are thereby horizontally transmitted in sequence, and derived as two parallel outputs. Furthermore, serial conversion is performed in multiplexor 29 at the last column, and each odd/even image element signal is supplied as an alternately connected black/white image signal to image processor 31 via A/D converter 30.

Figure 10:
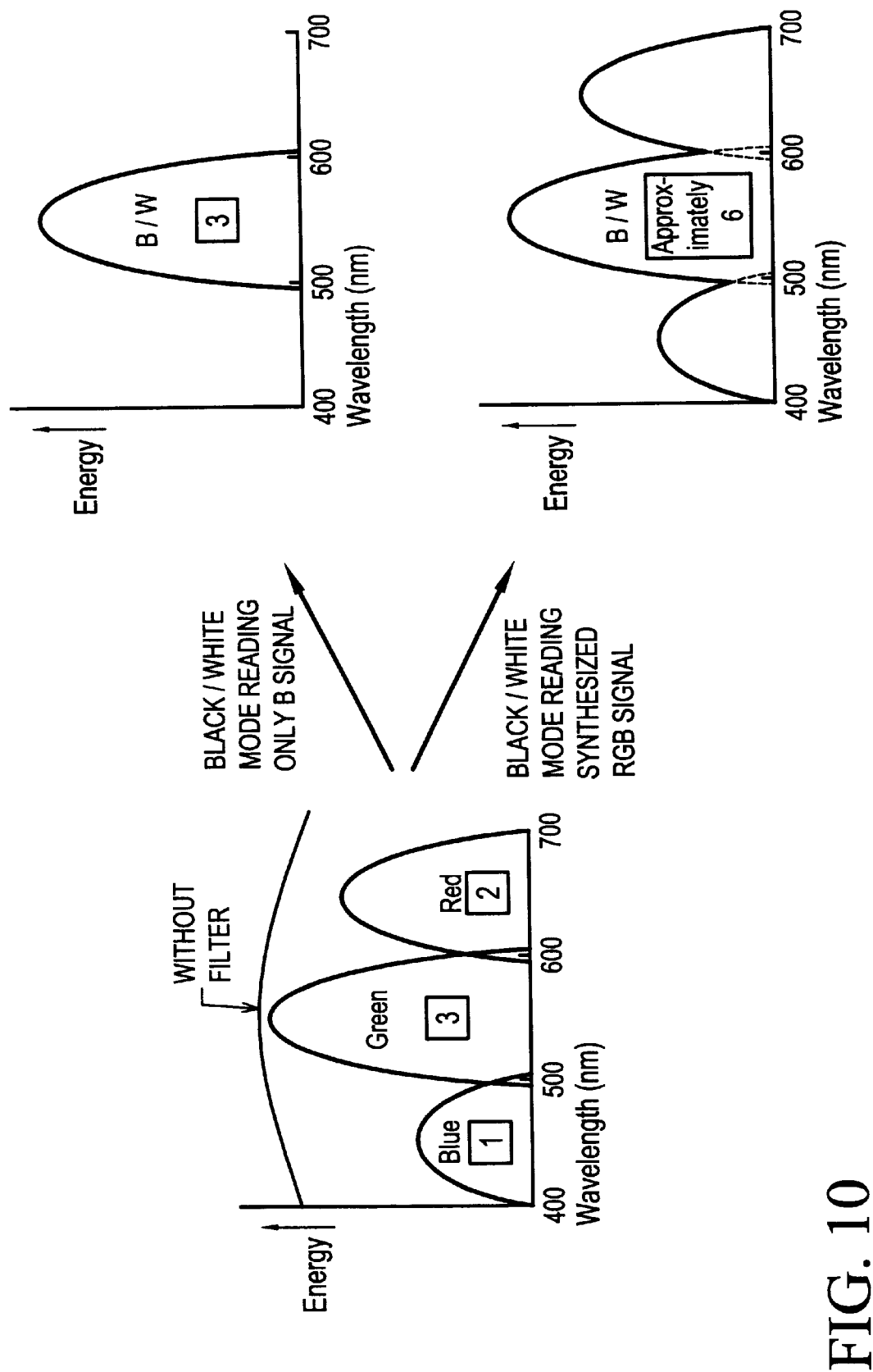
FIG. 10 is a characteristic diagram of energy output for light wave lengths.

The output energy relating to the combined light wave length when a tungsten lamp system light source, an infrared cut filter, a general B, G, R color filter and an Si photo diode are aligned, as shown in the characteristic diagram of schematic FIG. 10, is such that the signal output ratio of B, G and R, which is the integrated amount, is 1:3:2. The black/white read-out here is simply carried out using the highest signal output amount, which is G, and the output is the relative value of "3."

In an embodiment of the invention, for example, by adding signal charges of the three colors B, G and R, the signal charges of B and R can be effectively applied, and the relative charge amount becomes 6 as illustrated in FIG. 10, which is twice that when using only the G signal charge. In this case, the relation of the outputs corresponding to the incident light amounts of B, G and R respectively, or in other words, the linearity, will not be damaged even after addition, and a gradient reproduction of the concentration of the black/white original document is possible.

As described above, a dot-sequential color linear sensor uses a light sensitive image element array 12 in which image elements 11B, 11G and 11R of the first, second and third colors (for example, B, G and R) are dot-sequentially arranged. Independent shift gates 17B, 17G, 17R, 18B, 18G and 18R are provided by pixel unit for every color on both sides of the array, and two transmission registers 13 and 14 are arranged on one side of light sensitive image element array 12 for the first color. The register column number of the first color transmission registers 13 and 14 is one half that of the second and third color registers. With this structure, during the black/white mode, signal charges are output in parallel using the two transmission registers 13 and 14, and therefore, high-speed image reading is possible. Furthermore, signal charges of three color components B, G and R are added, so an increased signal output level is obtained.

Figure 13:
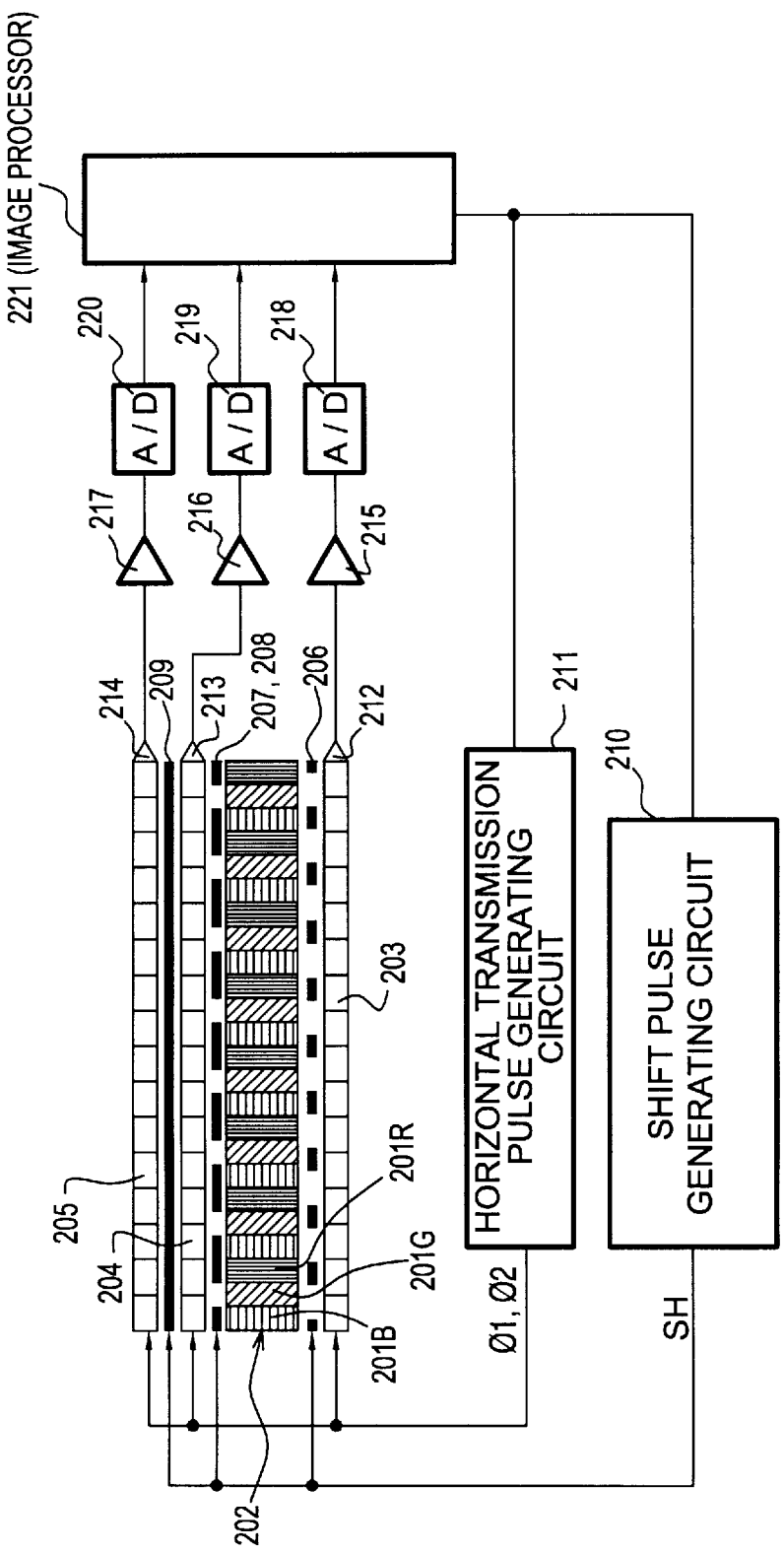
FIG. 13 is a schematic structural diagram showing a conventional example of a dot-sequential-type linear sensor.
Figure 14:
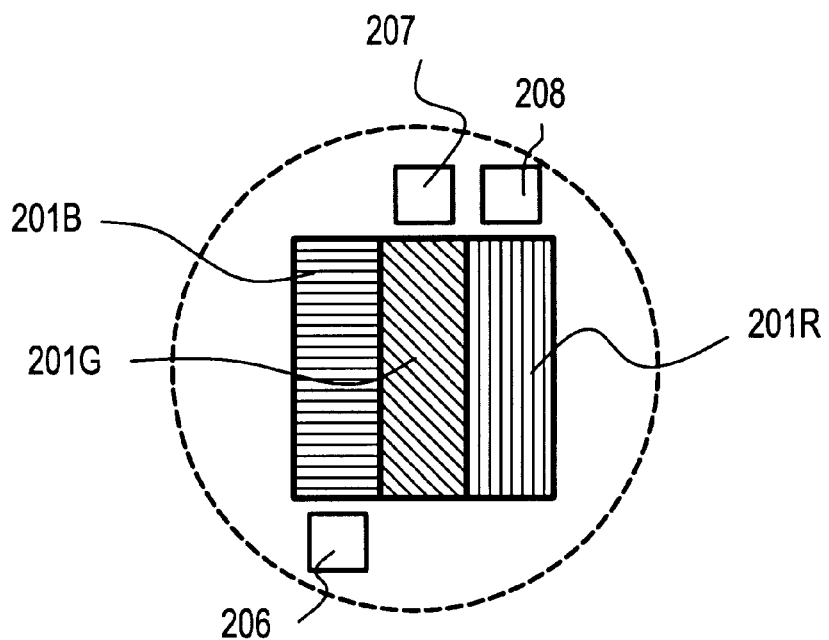
FIG. 14 is an enlarged diagram of one pixel unit in a conventional example.

The video rate and signal output levels, for the case of a dot-sequential-type color linear sensor relating to the conventional example shown in FIG. 13 and for the case of a dot-sequential-type color linear sensor relating to an embodiment of the invention are shown respectively in Chart 1 (prior structure) and Chart 2 (invention embodiment). For the dot-sequential-type color linear sensor of the prior structure, the case in which the black/white mode is implemented using the most sensitive G image element signal charge is considered.

CHART 1

|  | COLOR | | | BLACK/ |
|---|---|---|---|---|
|  | B | G | R | WHITE |
| VIDEO RATE | 1 | 1 | 1 | 1 |
| SIGNAL OUTPUT LEVEL | 1 | 3 | 2 | 3 |

CHART 2

|  | COLOR | | | BLACK/ |
|---|---|---|---|---|
|  | B | G | R | WHITE |
| VIDEO RATE | 1 | 1 | 1 | 2 |
| SIGNAL OUTPUT LEVEL | 1 | 3 | 2 | 6 |

In comparing Chart 1 (prior structure) with Chart 2 (invention embodiment), in the black/white mode of the embodiment, the signal charges are extracted as parallel output using the transmission registers 13 and 14, which have half the number of register columns, serially converted in multiplexor 29 of the last column, and a doubled video rate output is obtained. Thus, this video rate becomes "2", and by adding the signal charges of the three color components B, G and R, the signal output level becomes "6". The dynamic range is maintained, and an image read-out of a read-out speed twice that of the prior structure is realized.

In the above embodiment, an example of the first color as B, the second color as G, and the third color as R is explained. However, during the black/white mode, the signal charges of these three colors are ultimately mixed, so the same results are not necessarily obtained for each of the first through third colors.

Figure 11:
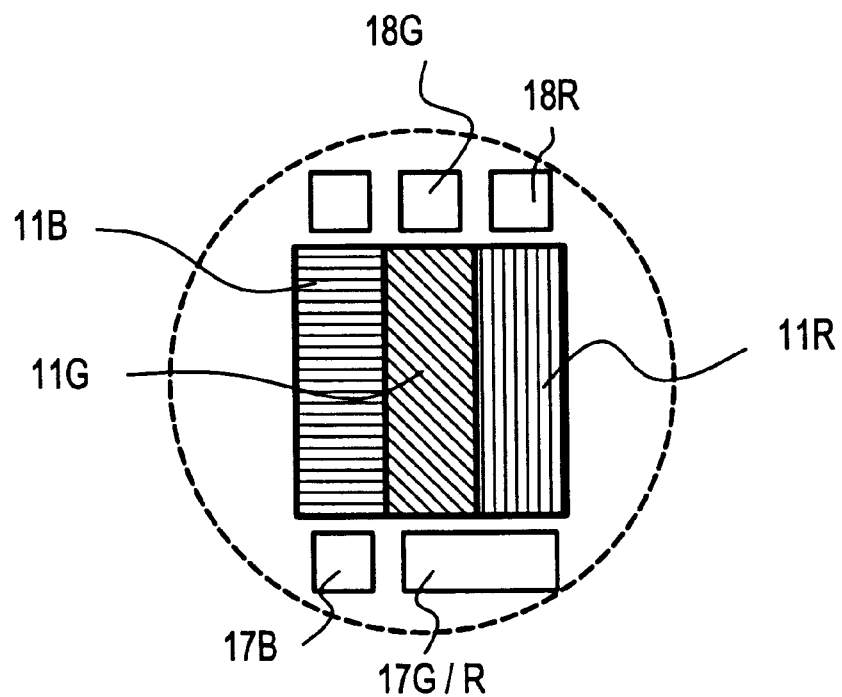
FIG. 11 is an enlarged diagram of one pixel unit showing an example of a modification in an embodiment of FIG. 1.
Figure 12:
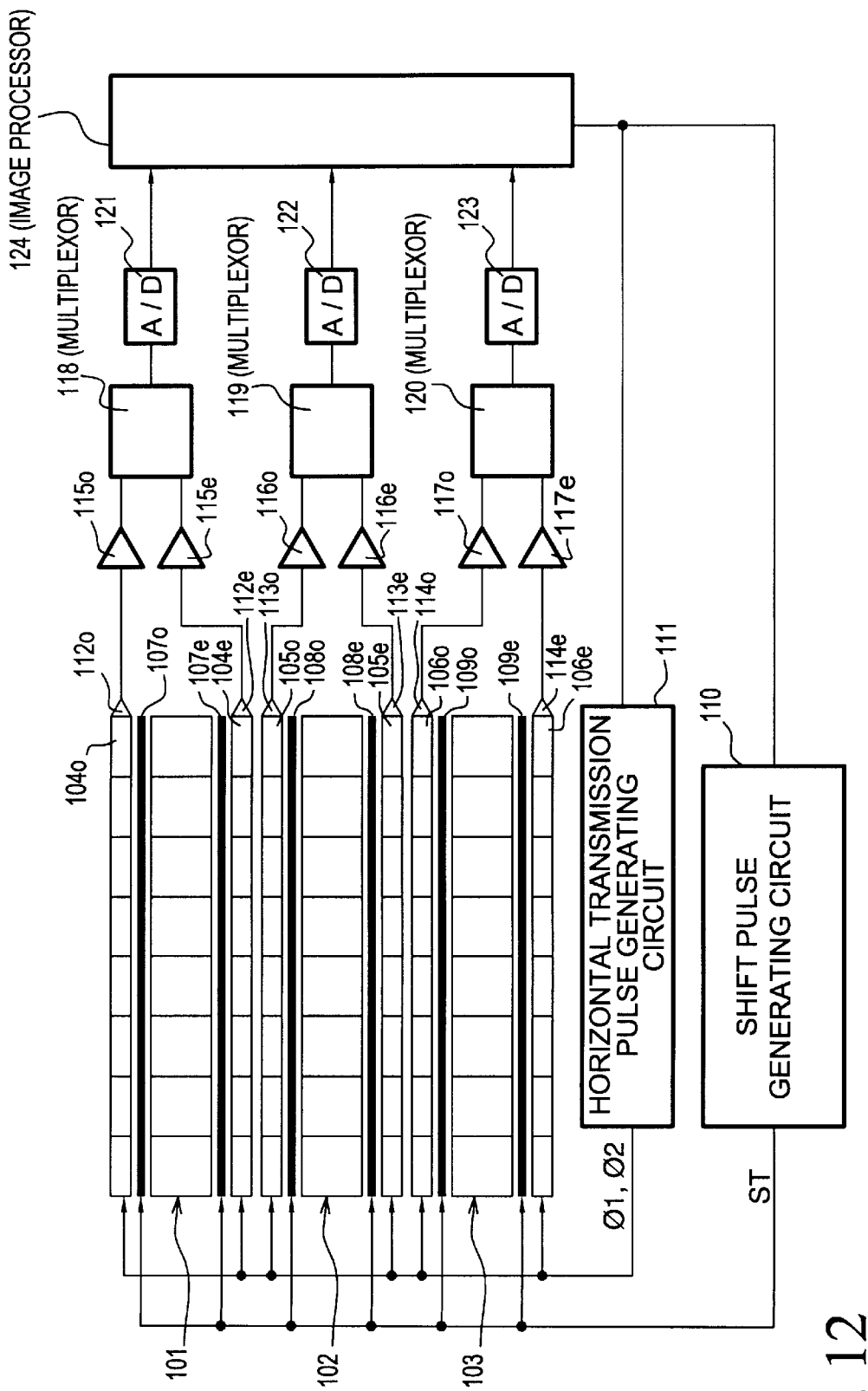
FIG. 12 is a schematic structural diagram showing a conventional example of a three-line-type linear sensor.

In addition, in the above embodiment, the shift gates used for read-out in transmission registers 13 and 14 are of a structure providing independent shift gates 17B, 17G and 17R for each color. However, each G and R signal charge is mixed with the B signal charge, so it is not necessary to provide independent shift gates 17G and 17R for G and R and, as shown in FIG. 11, a structure which provides common shift gates 17 G/R for G and R is also possible.

In addition, in the above embodiment, during the black/white mode, the three color components B, G and R are combined. However, it is not limited as such. The signal output level can also be increased as in the case of the single color G by combining the signal charges of the two colors G and B, or G and R. More specifically, as clearly shown in Chart 2, in the case of the two-color combination of G and B, the signal output level is "4", and in the case of the two-color combination of G and R, the signal output level is "5".

Furthermore, for the above embodiment, a structure was described in which the first color (G in this example) image element signal charge is divided into two systems of odd pixels and even pixels and read out by transmission registers 13 and 14, then output in parallel by transmission registers 13 and 14. However, a structure is also possible in which the first color signal charge is divided into three or more systems and output in parallel by three or more transmission registers. Accordingly, the transmission speed of the signal charge can be further increased.

As explained above, in the present invention, a solid-state imaging element comprises a color filter which selectively transmits an optical image in color components, and in which a plurality of colors are arranged as one group in a sequential plural group configuration, and photoelectric conversion means for receiving an optical image that has passed through the color filter and for converting the received optical image to electric signals. With this structure, it is possible to improve the dynamic range without losing the advantage of superior image quality and low cost achieved in a dot-sequential-type, because it is possible to increase the signal output level by combining at least two of the electric signals correlating to the colors of one group of the color filter converted by the photoelectric conversion means. This is an improvement over the case in which only electric signals corresponding to one color of the colors of one group of the color filter are read out.

In addition, it is possible to improve the video rate because the transmission speed of the signal charge in the first transmission register is n times that of the second and third transmission registers. This is achieved by arranging on one side of the photoelectric conversion means, a first transmission register that divides a signal charge corresponding to the first color of the colors of a group of the color filter into n (n≧2) systems and transmits them in parallel, and by arranging, on the other, opposing side of the photoelectric conversion means, second and third transmission registers that respectively transmit signal charges corresponding to the second and third colors of the colors of one group of the color filter, and combining the signal charge of the first transmission register, and by setting the number of register columns in the first transmission register to be 1/n that of the second and third transmission registers.

In an image reading device according to the present invention, a dot-sequential-type solid-state imaging element relating to the structure described above in the present invention is provided as a sensor for image reading. As a result, it is possible to obtain high productivity by improving the dynamic range and video rate during reading of a black/white original document, and to maintain the high image quality that is the advantage of the dot-sequential solid-state imaging element during reading of color images.

Therefore, while this invention has been described in conjunction with the specific embodiments outlined above, it is evident that many alternatives, modifications and variations will be apparent to those skilled in the art. Accordingly, the embodiments of the invention set forth above are intended to be illustrative, not limiting. Various changes may be made without departing from the spirit and scope of the invention as defined in the following claims.

What is claimed is:

1. A solid-state imaging element, comprising:
    a color filter which selectively transmits an optical image in color components, and in which a plurality of colors, including at least blue, green and red, are arranged as one group in a sequential plural group configuration;
    photoelectric converting means for receiving an optical image that has passed through said color filter and for combining the received optical image to electric signals;

combining means for combining at least two of the electric signals correlating to the colors of said one group of said color filter converted by said photoelectric conversion means;

a first output component arranged on one side of said photoelectric conversion means for dividing into n (n≧2) systems an electric signal corresponding to a first color of the colors of a group of said color filter converted by said photoelectric conversion means and for outputting the resultant signals in parallel; and second and third output components arranged on the other side of said photoelectric conversion means for respectively outputting in parallel the electric signals corresponding to second and third colors of the colors of a group of said color filter converted by said photoelectric conversion means.

2. The solid-state imaging element as set forth in claim 1, wherein said combining means combines electric signals in said first output component.

3. The solid-state imaging element as set forth in claim 2, further comprising:

a color mode for outputting electric signals corresponding to said first color in said first output component in parallel, and for outputting electric signals corresponding to said second and third colors in said second and third output components in parallel, and a black/white mode for combining at least two of the electric signals corresponding to the colors of said one group of said color filter in said first output component and for outputting said electric signals corresponding to the colors of said one group of said color filter in parallel.

4. The solid-state imaging element as set forth in claim 1, wherein said first, second and third output components comprise transmission registers which transmit signal charges read out from said photoelectric conversion means, and wherein a number of register columns of said first output component is set to be 1/n of the number of register columns of said second and third output components.

5. The solid-state imaging element as set forth in claim 1, further comprising:

a gate component for separating an electric signal corresponding to the colors of said one group of said color filter converted by said photoelectric conversion means into the n (n>2) systems, and for outputting the n (n>2) systems.

6. The solid-state imaging element as set forth in claim 5, wherein said gate component independently outputs electric signals corresponding to each color of said one group of said color filter.

7. An image reading device, comprising:

a solid-state imaging element, comprising:

a color filter which selectively transmits an optical image in color components, and in which a plurality of colors, including at least blue, green and red, are arranged as one group in a sequential plural group configuration;

photoelectric conversion means for receiving an optical image that has passed through said color filter and for converting the received optical image to electric signals;

combining means for combining at least two of the electric signals correlating to the colors of said one group of said color filter converted by said photoelectric conversion means, wherein the solid-state imaging element is arranged in a main scanning direction, and further comprising:

an optical scanning system for optically scanning the original document in a secondary scanning direction, and for irradiating the optical image to the imaging surface of said solid-state imaging element;

a first output component arranged on one side of said photoelectric conversion means for dividing into n (n≧2) systems an electric signal corresponding to a first color of the colors of a group of said color filter converted by said photoelectric conversion means and for outputting the resultant signals in parallel; and second and third output components arranged on the other side of said photoelectric conversion means for respectively outputting in parallel the electric signals corresponding to second and third colors of the colors of a group of said color filter converted by said photoelectric conversion means.

8. The image reading device as set forth in claim 7, wherein in the solid-state imaging element said combining means combines electric signals in said first output component.

9. The image reading device as set forth in claim 8, wherein the solid-state imaging element further comprises:

a color mode for outputting electric signals corresponding to said first color in said first output component in parallel, and for outputting electric signals corresponding to said second and third colors in said second and third output components in parallel, and a black/white mode for combining at least two of the electric signals corresponding to the colors of said one group of said color filter in said first output component and for outputting said electric signals corresponding to the colors of said one group of said color filter in parallel.

10. The image reading device as set forth in claim 7, wherein in the solid-state imaging element said first, second and third output components comprise transmission registers which transmit signal charges read out from said photoelectric conversion means, and wherein a number of register columns of said first output component is set to be 1/n of the number of register columns of said second and third output components.

11. The image reading device as set forth in claim 7, wherein the solid-state imaging element further comprises:

a gate component for separating an electric signal corresponding to the colors of said one group of said color filter converted by said photoelectric conversion means into at least two parts, and for outputting the at least two parts.

12. The image reading device as set forth in claim 11, wherein in the solid-state imaging element said gate component independently outputs electric signals corresponding to each color of said one group of said color filter.

* * * * *